(12) United States Patent
Horton et al.

(10) Patent No.: US 6,907,438 B1
(45) Date of Patent: Jun. 14, 2005

(54) TWO-DIMENSIONAL INVERSE DISCRETE COSINE TRANSFORM USING SIMD INSTRUCTIONS

(75) Inventors: David Horton, Austin, TX (US); Yi Liu, Austin, TX (US); Wei-Lien Hsu, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 538 days.

(21) Appl. No.: 09/798,660

(22) Filed: Mar. 2, 2001

Related U.S. Application Data (63) Continuation-in-part of application No. 09/776,080, filed on Feb. 1, 2001.

(51) Int. Cl.[7] .............................................. G06F 17/14
(52) U.S. Cl. ...................................... 708/402; 708/400
(58) Field of Search ................................ 708/400–409, 708/520; 711/170; 345/654, 561

(56) References Cited

U.S. PATENT DOCUMENTS

| | | | | |
|---|---|---|---|---|
| 5,754,457 A | * | 5/1998 | Eitan et al. .................. | 708/402 |
| 5,815,421 A | * | 9/1998 | Dulong et al. ............... | 708/520 |
| 5,845,112 A | * | 12/1998 | Nguyen et al. .............. | 708/402 |
| 5,974,515 A | * | 10/1999 | Bachmat et al. ............ | 711/170 |
| 6,018,351 A | * | 1/2000 | Mennemeier et al. ....... | 345/654 |
| 6,067,099 A | * | 5/2000 | Kabir et al. ................. | 345/561 |
| 6,141,673 A | * | 10/2000 | Thayer et al. ............... | 708/402 |
| 6,421,696 B1 | * | 7/2002 | Horton ........................ | 708/404 |

OTHER PUBLICATIONS

Hung et al., Statistical Inverse Discrete Cosine Transforms for Image Compression, May 1994, Proc. of SPIE Digital Video Comrpssion on Personal COmputers: Algorithms and Technologies, vol. 2187, pp. 196–207.*

(Continued)

*Primary Examiner*—Chat C. Do
(74) *Attorney, Agent, or Firm*—Meyertons Hood Kivlin Kowert & Goetzel, P.C.; B. Noël Kivlin

(57) ABSTRACT

A method is disclosed for performing an inverse discrete cosine transform (IDCT) using a microprocessor having an instruction set that includes SIMD floating-point instructions. In one embodiment, the method includes: (1) receiving a block of integer data having C columns and R rows; and (2) for each row, (a) loading the row data into registers; (b) converting the row data into floating-point form so that the registers each hold two floating-point row data values; and (c) using SIMD floating-point instructions to perform weighted-rotation operations on the values in the registers. Suitable SIMD floating-point instructions include the pswap, pfmul, and pfpnacc instructions. For the row-IDCT, the data values are preferably ordered in the registers so as to permit the use of these instructions. For the column-IDCT, two columns are preferably processed concurrently using SIMD instructions to improve computational efficiency. An intermediate buffer may be used to avoid unnecessary conversions between integer and floating-point format.

12 Claims, 4 Drawing Sheets

OTHER PUBLICATIONS

Yung–Pin et al., A Cost–Effective Architecutre for 8×8 Two–Dimensional DCT/IDCT Using Direct Method, 1997, IEEE Transactions on Circuits and Systems for Video Technology, vol. 7, No. 3, p. 459–467.*

Kuo–Hsing et al., The Designa nd Implementation of DCT?IDCT Chip with Novel Architecture, 2000, IEEE INternational Symposium on Circuits and Systems, p. IV–741–IV–744.*

"Intel Architecture Software Developer's Manual, vol. 2: Instruction Set Reference", Intel Corporation, 1999.

"Enhanced 3DNow!™ Technology for the AMD Athlon™ Processor," Aug. 2000, Advanced Micro Devices, Inc., pp. 1–11.

"Inside 3DNow!™ Technology," © 2001 Advanced Micro Devices, Inc., pp. 1–4, http://www.amd.com/products/cpg/k623d/inside3d.html.

"3DNow!™ Technology in Microsoft DirectX 6.x," © 2001 Advanced Micro Devices, Inc. pp.1–6, http://www.amd.com/products/cpg/3dnow/3ddirectx.html.

"3DNow!™ Fact Sheet," © 2001 Advanced Micro Devices, Inc., p. 1, http://www.amd.com/products/cpg/3dnow/factsheet.html.

"AMD 3DNow!™ Frequently Asked Questions," ™ 2001 Advanced Micro Devices, Inc, p. 1, http://www1.amd.com/products/cpg/result/1,1265,168,00.html.

"3DNow!™ Technology Manual", © 2000 Advanced Micro Devices, Inc., pp. 1–62.

"AMD Extensions to the 3DNow!™ and MMX™ Instructions Sets Manual", © 2000 Advanced Micro Devices, Inc., pp. 1–36.

* cited by examiner

TWO-DIMENSIONAL INVERSE DISCRETE COSINE TRANSFORM USING SIMD INSTRUCTIONS

PRIORITY INFORMATION

This application is a continuation-in-part application of U.S. application Ser. No. 09/776,080, entitled "Two-Dimensional Discrete Cosine Transform Using SIMD Instructions", filed Feb. 1, 2001.

BACKGROUND

1. Field of the Invention

The present invention relates generally to systems and methods for performing discrete cosine transform (DCT) and inverse discrete cosine transform (IDCT) operations. The invention also relates to digital video compression and decompression, and more particularly to a video encoder and decoder utilizing two-dimensional discrete cosine transform and/or two-dimensional inverse discrete cosine transform using single-instruction, multiple-data (SIMD) instructions to obtain improved efficiency.

2. Description of the Related Art

DSP theory provides a host of tools for the analysis and representation of signal data. The discrete cosine transform and its inverse are among the more ubiquitous of these tools in multimedia applications. The discrete cosine transform (DCT) of a discrete function $f(j)$, $j=0, 1, \ldots, N-1$ is defined as $$F(k) = \frac{2c(k)}{N} \sum_{j=0}^{N-1} f(j) \cdot \cos\left[\frac{(2j+1)k\pi}{2N}\right],$$

where $k=0, 1, \ldots, N-1$, and $$c(k) = \begin{cases} 1/\sqrt{2} & \text{for } k = 0 \\ 1 & \text{for } k \neq 0 \end{cases}.$$

The inverse discrete cosine transform (IDCT) is defined by $$f(j) = \sum_{k=0}^{N-1} c(k) F(k) \cos\left[\frac{(2j+1)k\pi}{2N}\right],$$

where $j=0, 1, \ldots, N-1$.

The discrete cosine transform may be used in a variety of applications and allows an arbitrary input array size. However, the straightforward DCT algorithm is often prohibitively time-consuming especially when executed on general-purpose processors. In 1977, Chen et al. disclosed an efficient algorithm for performing the DCT (Wen-Hsiung Chen, C. Harrison Smith and S. C. Fralick, "A Fast Computational Algorithm for the Discrete Cosine Transform", published in IEEE Transactions on Communications, Vol. COM-25, No. 9, September 1977, hereby incorporated by reference). Fast DCT algorithms such as that disclosed by Chen et al. are significantly more efficient than the straightforward DCT algorithm. Nevertheless, there remains significant room for improvement, particularly when the algorithm is employed in specific circumstances.

Traditional x86 processors are not well adapted for the types of calculations used in signal processing. Thus, signal processing software applications on traditional x86 processors have lagged behind what was realizable on other processor architectures. There have been various attempts to improve the signal processing performance of x86-based systems. For example, microcontrollers optimized for digital signal processing computations (DSPs) have been provided on plug-in cards or the motherboard. These microcontrollers operated essentially as hardwired coprocessors enabling the system to perform signal processing functions.

As multimedia applications become more sophisticated, the demands placed on computers are redoubled. Microprocessors are now routinely provided with enhanced support for these applications. For example, many processors now support single-instruction multiple-data (SIMD) commands such as MMX instructions. Advanced Micro Devices, Inc. (hereinafter referred to as AMD) has proposed and implemented 3DNow!™, a set of floating-point SIMD instructions on x86 processors starting with the AMD-K6®-2. The AMD-K6®-2 is highly optimized to execute the 3DNow!™ instructions with minimum latency. Software applications written for execution on the AMD-K6®-2 may use these instructions to accomplish signal processing functions and the traditional x86 instructions to accomplish other desired functions.

The 3DNow! instructions, being SIMD commands, are "vectored" instructions in which a single operation is performed on multiple data operands. Such instructions are very efficient for graphics and audio applications where identical operations are repeated on each sample in a stream of data. SIMD commands inherently execute operations in parallel; in superscalar microprocessors that employ pipelining and/or multiple execution units, this parallelism may be substantially increased to potentially execute 4–8 or more operations simultaneously.

Vectored instructions typically have operands that are partitioned into separate sections, each of which is independently operated upon. For example, a vectored multiply instruction may operate upon a pair of 32-bit operands. Upon execution of a vectored multiply instruction, corresponding sections of each operand are independently multiplied. So, for example, the result of a vectored multiplication of [3;5] and [7;11] would be [21;55]. To quickly execute vectored multiply instructions, microprocessors such as the AMD-K6®-2 use a number of multipliers in parallel.

Figure 1:
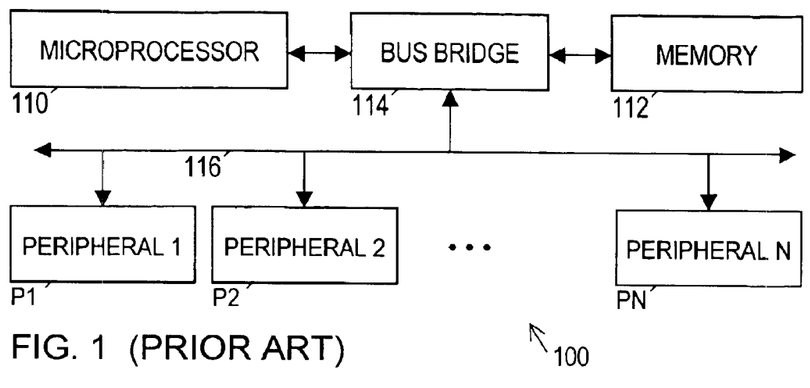
FIG. 1 shows one embodiment of a computer system.

FIG. 1 illustrates one embodiment of a representative computer system 100 such as the AMD-K6®-2, which is configured to support the execution of general-purpose instructions and parallel floating-point instructions. Computer system 100 may comprise a microprocessor 110, memory 112, bus bridge 114, peripheral bus 116, and a plurality of peripheral devices P1–PN. Bus bridge 114 couples to microprocessor 110, memory 112 and peripheral bus 116. Bus bridge 114 mediates the exchange of data between micro-processor 110, memory 112 and peripheral devices P1–PN.

Microprocessor 110 is a superscalar microprocessor configured to execute instructions in a variable length instruction set. A subset of the variable length instruction set is the set of SIMD (simultaneous-instruction multiple-data) floating-point instructions. Microprocessor 110 is optimized to execute the SIMD floating-point instructions in a single clock cycle. In addition, the variable length instruction set includes a set of x86 instructions (e.g. the instructions defined by the 80486 processor architecture).

Memory 112 stores program instructions that control the operation of microprocessor 110. Typically, memory 112 also stores input data to be operated on by microprocessor 110, and stores output data generated by microprocessor 110, in response to the program instructions. In some embodiments, a separate data memory may be provided so that the instruction code is segregated from the input and output data. Peripheral devices P1–PN are representative of devices such as network interface cards (e.g. Ethernet cards), modems, sound cards, video acquisition boards, data acquisition cards, external storage media, etc. Computer system 100 may be a personal computer, a laptop computer, a portable computer, a television, a radio receiver and/or transmitter, etc.

Figure 2:
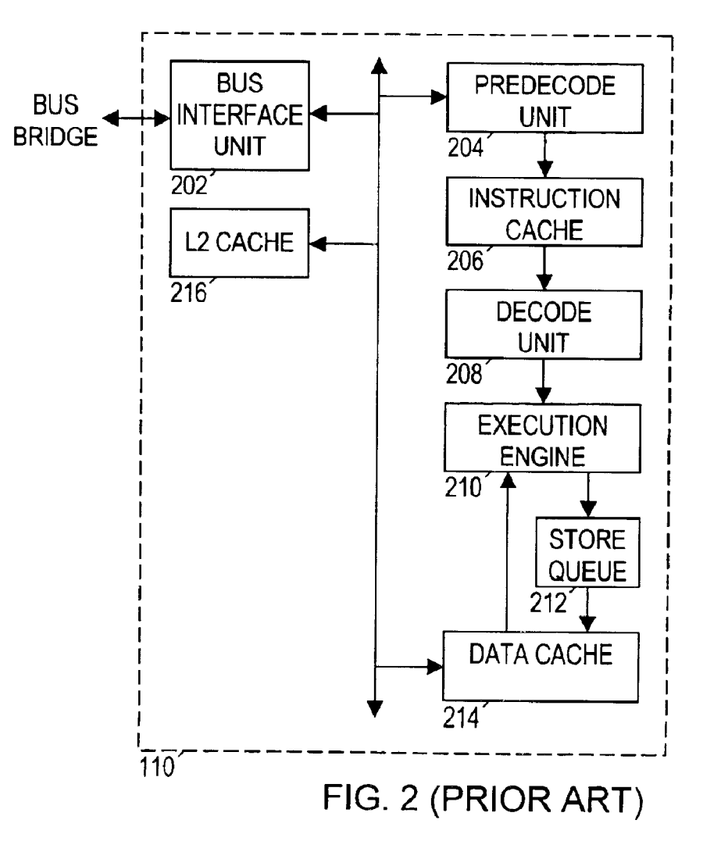
FIG. 2 shows one embodiment of a microprocessor.

FIG. 2 illustrates one embodiment for microprocessor 110. Microprocessor 110 may be configured with 3DNow!™ and MMX® technologies. Microprocessor 110 may comprise bus interface unit 202, predecode unit 204, instruction cache 206, decode unit 208, execution engine 210, and data cache 214. Microprocessor 110 may also include store queue 212 and an L2 cache 216. Additionally, microprocessor 110 may include a branch prediction unit and a branch resolution unit (not shown) to allow efficient speculative execution.

Predecode unit 204 may be coupled to instruction cache 206, which stores instructions received from memory 112 via bus interface unit 202 and predecode unit 204. Instruction cache 206 may also contain a predecode cache (not shown) for storing predecode information. Decode unit 208 may receive instructions and predecode information from instruction cache 206 and decode the instructions into component pieces. The component pieces may be forwarded to execution engine 210. The component pieces may be RISC operands. (Microprocessor 110 may be RISC-based superscalar microprocessor). RISC ops are fixed-format internal instructions, most of which are executable by microprocessor 110 in a single clock cycle, and several may be executed within a single cycle, depending upon the CPU resources required by the particular RISC instructions. RISC operations may be combined to form every function of the x86 instruction set.

Figure 3:
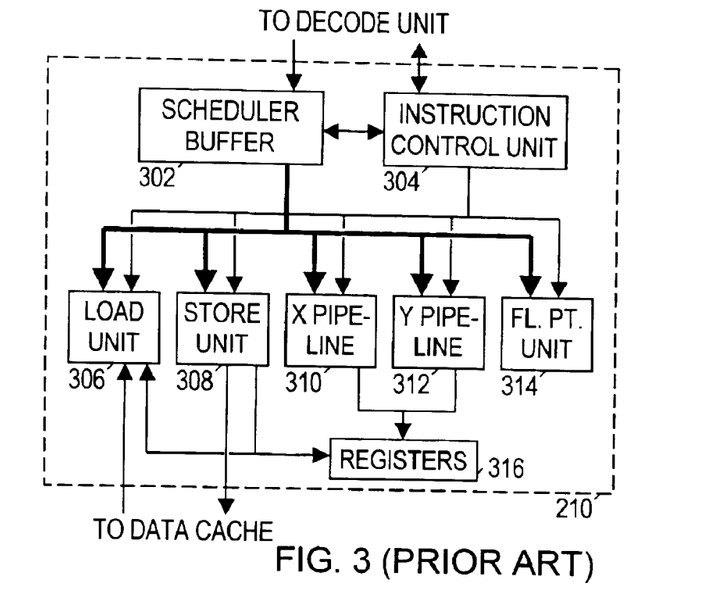
FIG. 3 shows one embodiment of an execution engine within a microprocessor.

Execution engine 210 may execute the decoded instructions in response to the component pieces received from decode unit 208. As shown in FIG. 3, execution engine 210 may include a scheduler buffer 302 coupled to receive input from decode unit 208. Scheduler buffer 302 may be configured to convey decoded instructions to a plurality of execution pipelines 306–314 in accordance with input received from instruction control unit 304. Execution pipelines 306–314 are representative, and in other embodiments, varying numbers and kinds of pipelines may be included.

Instruction control unit 304 contains the logic necessary to manage out of order execution of instructions stored in scheduler buffer 302. Instruction control unit 304 also manages data forwarding, register renaming, simultaneous issue and retirement of RISC operations, and speculative execution. In one embodiment, scheduler buffer 302 holds up to 24 RISC operations at one time. When possible, instruction control unit 304 may simultaneously issue (from buffer 302) a RISC operation to each available execution unit.

Execution pipelines 306–315 may include load unit 306, store unit 308, X pipeline 310, Y pipeline 312, and floating-point unit 314. Load unit 306 may receive input from data cache 214, while store unit 308 may interface to data cache 214 via a store queue 212. Store unit 308 and load unit 306 may be pipelined designs. Store unit 308 may perform memory writes. For a memory write operation, the store unit 308 may generate a physical address and the associated data bytes that are to be written to memory. These results (i.e. physical address and data bytes) may be entered into the store queue 212. Memory read data may be supplied by data cache 214 or by an entry in store queue 212 (in the case of a recent store).

X pipeline 310 and Y pipeline 312 may each include a combination of integer, integer SIMD (e.g. MMX®), and floating-point SIMD (e.g. 3DNow!™) execution resources. Some of these resources may be shared between the two register pipelines. As suggested by FIG. 3, load unit 306, store unit 308, and pipelines 310, 312 may be coupled to a set of registers 316 from which these units are configured to read source operands. In addition, load unit 306 and pipelines 310, 312 may be configured to store destination result values to registers 316. Registers 316 may include physical storage for a set of architected registers.

Floating-point unit 314 may also be coupled with a set of floating-point registers (not shown separately). Floating-point unit 314 may execute floating-point instructions (e.g. x87 floating-point instructions, or IEEE 754/854 compliant floating-point instructions) designed to accelerate the performance of scientific software. Floating-point unit 314 may include an adder unit, a multiplier unit, and a divide/square-root unit, etc. Floating-point unit 314 may operate in a coprocessor-like fashion, in which decode unit 208 directly dispatches the floating-point instructions to unit 314. The floating-point instructions may still be allocated in scheduler buffer 302 to allow for in-order retirement of instructions. Unit 314 and scheduler buffer 302 may communicate to determine when a floating-point instruction is ready for retirement.

Pipelines 310, 312 include resources that allow them to perform scalar integer operations, SIMD integer operations, and SIMD floating-point operations. The SIMD integer operations that are performed correspond to the MMX® instruction set architecture, and the SIMD floating-point operations that are performed correspond to the 3DNow!™ instruction set. Any pair of operations which do not require a common resource may be simultaneously executed in the two pipelines (i.e. one operation per pipeline). Thus, the maximum rate of execution for the two pipelines taken together is equal to two operations per cycle.

Registers 316 may include registers which are configured to support packed integer and packed floating-point operations (e.g. registers denoted MM0 through MMn which conform to the 3DNow!™ and MMX® instruction set architectures). In one embodiment of microprocessor 110, there are eight MM registers, i.e. MM0 through MM7, each having a 64 bit storage capacity. Two 32-bit floating-point operands may be loaded into each MM register in a packed format. For example, suppose register MM0 has been loaded with floating-point operands A and B, and register MM1 has been loaded with floating-point operands C and D. In shorthand notation, this situation may be represented by the expressions MM0=[A:B] and MM1=[C:D], where the first argument in a bracketed pair represents the high-order 32 bits of a quadword register, and the second argument represents the low-order 32 bits of the quadword register. The 3DNow!™ instructions invoke parallel floating-point operations on the contents of the MM registers. For example, the 3DNow!™ multiply instruction given by the assembly language construct "pfmul MM0,MM1"

invokes a parallel floating-point multiply on corresponding components of MM0 and MM1. The two floating-point resultant values of the parallel multiply are stored in register MM0. Thus, after the instruction has completed execution, register MM0 may be represented by the expression MM0=[A*C:B*D]. As used herein, the assembly language construct "pfxxx MMdest, MMsrc"

implies that a 3DNow!™ operation corresponding to the mnemonic pfxxx uses registers MMdest and MMsrc as source operands, and register MMdest as a destination operand.

The assembly language construct

"pfadd MM0,MM1"

invokes a parallel floating-point addition on corresponding components of registers MM0 and MM1. Thus, after this instructions has completed execution, register MM0 may be represented by the expression MM0=[A+C:B+D].

It is noted that alternate embodiments of microprocessor 110 are contemplated where the storage capacity of an MM register allows for more than two floating-point operands. For example, an embodiment of microprocessor 110 is contemplated where the MM registers are configured to store four 32-bit floating-point operands. In this case, the MM registers may have a size of 128-bits.

Multimedia applications demand increasing amounts of storage and transmission bandwidth. Thus, multimedia systems use various types of audio/visual compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods arc used exclusively for motion video, either alone or in conjunction with intraframe compression methods.

Intraframe or still image compression techniques generally use frequency domain techniques, such as the two-dimensional discrete cosine transform (2D-DCT). The frequency domain characteristics of a picture frame generally allow for easy removal of spatial redundancy and efficient encoding of the frame. One video data compression standard for still graphic images is JPEG (Joint Photographic Experts Group) compression. JPEG compression is actually a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format Successive frames are compared with the key frame, and only the differences between the key frame and the successive frames are stored. Periodically, such as when new scenes are displayed, new key frames are stored, and subsequent comparisons begin from this new reference point. The difference frames are further compressed by such techniques as the 2D-DCT. Examples of video compression which use an interframe compression technique are MPEG (Moving Pictures Experts Group), DVI and Indeo, among others.

MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the 2D-DCT. After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). This relative encoding is achieved by the process of motion estimation. The difference image as a result of motion compensation is further compressed by means of the 2D-DCT, quantization and RLE entropy coding.

When an MPEG decoder receives an encoded stream, the MPEG decoder reverses the above operations. Thus the MPEG decoder performs inverse scanning to remove the zig zag ordering, inverse quantization to de-quantize the data, and the inverse 2D-DCT to convert the data from the frequency domain back to the pixel domain. The MPEG decoder also performs motion compensation using the transmitted motion vectors to recreate the temporally compressed frames.

Computation of the 2D-DCT as well as computation of the two-dimensional inverse discrete cosine transform (2D-IDCT) in multimedia systems generally require a large amount of processing. For example, hundreds of multiplication (or division) operations as well as hundreds of addition (or subtraction) operations may be required to perform the 2D-DCT or IDCT upon a single 8×8 array. Such computational requirements can be extremely time-consuming and resource intensive when hundred of thousands of 8×8 blocks are processed every second.

A new system and method are desired for efficiently computing the forward and/or inverse discrete cosine transform. It is particularly desirable to provide a system for computing the two-dimensional forward and/or inverse discrete cosine transform which reduces computational requirements in a general purpose computer system.

SUMMARY OF THE INVENTION

The problems discussed above are in large part addressed by a method of performing an inverse discrete cosine transform (DCT) using a microprocessor having an instruction set that includes SIMD floating-point instructions. In one embodiment, the method includes: (1) receiving a block of integer data having C columns and R rows; and (2) for each row, (a) loading the row data into registers; (b) converting the row data into floating-point form so that the registers each hold two floating-point row data values; and (c) using SIMD floating-point instructions to perform rotation operations on the values in the registers. Suitable SIMD floating-point instructions include the pswap, pfmul, and pfpnacc instructions. For the row-IDCT, the data values are preferably ordered in the registers so as to permit the use of these instructions. For the column-IDCT, two columns are preferably processed concurrently using SIMD instructions to improve computational efficiency. An intermediate buffer may be used to avoid unnecessary conversions between integer and floating-point format.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

TERMINOLOGY

As used herein, the term multimedia instruction refers to the above described packed integer operations (e.g. operations such as those defined by the MMX instructions within the x86 instruction set) and to packed floating-point operations optimized for three dimensional graphics calculations and/or physics calculations (e.g. operations such as those defined by the 3DNow! instructions). These instructions may be defined to operate, for example, on two 32-bit floating-point numbers packed into a given multimedia register. Other packed floating-point formats may be used as well.

DETAILED DESCRIPTION OF PREFERRED EMBODIMENTS

The DCT and IDC transforms discussed in the background can be extended to two dimensions. This may be done, for example, on a flat image to identify the spatial frequency components of the image. Typically, the image is expressed in terms of small picture elements, termed pixels, laid out in a rectangular grid and each assigned a single color value. (The color value may be expressed in terms of multiple components such as Red, Green and Blue intensities, but this is easily accounted for by repeating the process disclosed below for each component). To minimize hardware requirements, the image is generally divided into small, square blocks of pixels (e.g. 8×8 pixels forms a block), termed macroblocks, and the two-dimensional transforms are applied to each block separately.

Since the DCT and IDCT transforms are linear, when they are extended to two dimensions the horizontal and vertical transforms can be performed independently and in any order. FIG. 5 shows a flowchart of one method for performing any linear transform in two dimensions. In the ensuing discussion, the method is applied to a two-dimensional block of data having $R_{max}+1$ rows and $C_{max}+1$ columns (i.e. the row indices range from 0 to $R_{max}$, and the column indices range from 0 to $C_{max}$) This method will be described with references to FIGS. 4A–4B, where the configuration of data is shown at various points in the flowchart. For clarity in these figures, the number of rows and columns are assumed to equal eight, but other values are also contemplated.

It is contemplated that the method of FIG. 5 may take the form of a subroutine. When this subroutine is called, it would be provided with an input block of data 402 such as that shown at the top of FIG. 4A. Data block X has components $X_{RC}$, where index R indicates the row number and index C indicates the column number. The preferred implementation features 16-bit integer inputs, though other implementations with different input types are contemplated.

In FIG. 5, row index R is initialized to 0 in block 502. Blocks 504, 506, and 508 form a loop in which one-by-one, the rows of data block X are individually transformed. In block 504, the transform is performed on the current row as determined by row index R. In block 506, the row index R is compared to $R_{max}$, the highest row index in the data block.

If the last row has not yet been transformed, then in block 508 the row index R is incremented and the loop is repeated until each row has been transformed.

Figure 4A:
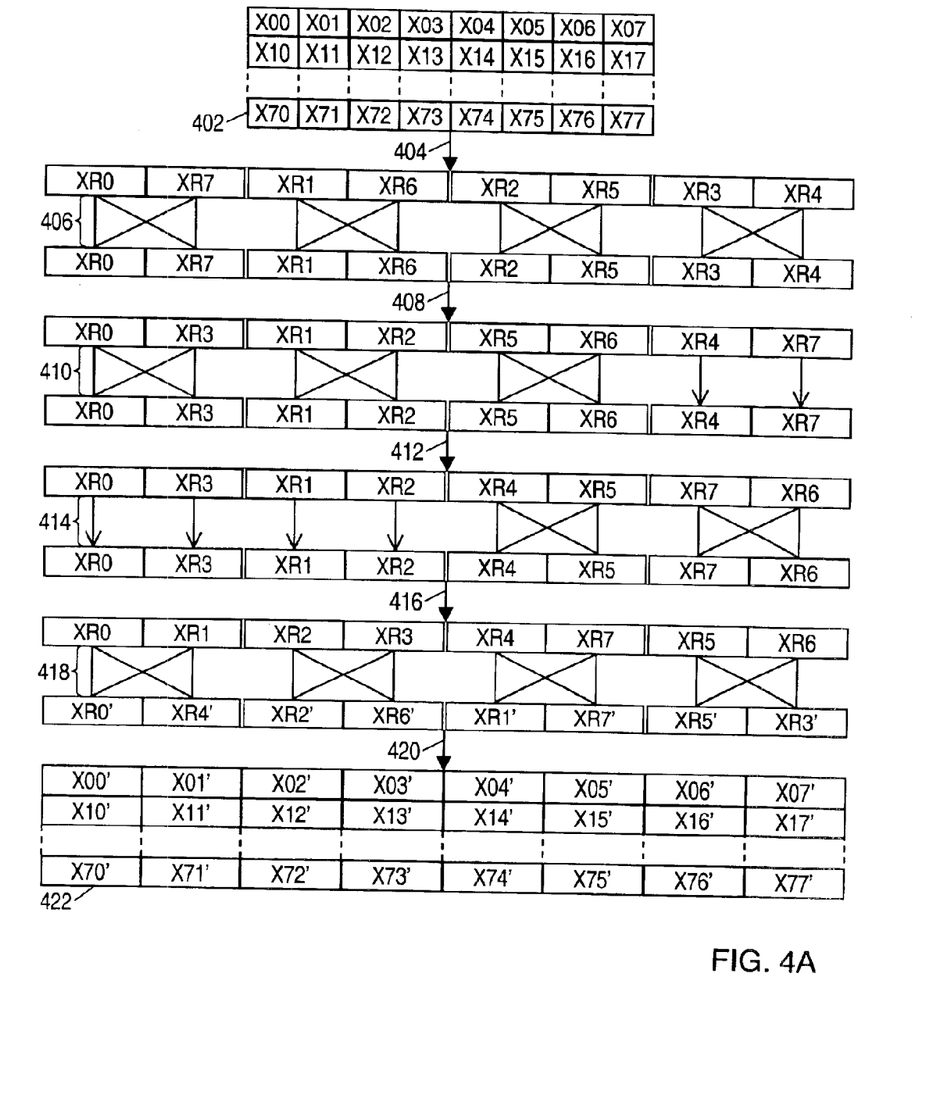
FIGS. 4A–4B show data configurations at various points in a two dimensional transform.
Figures 5, 6:
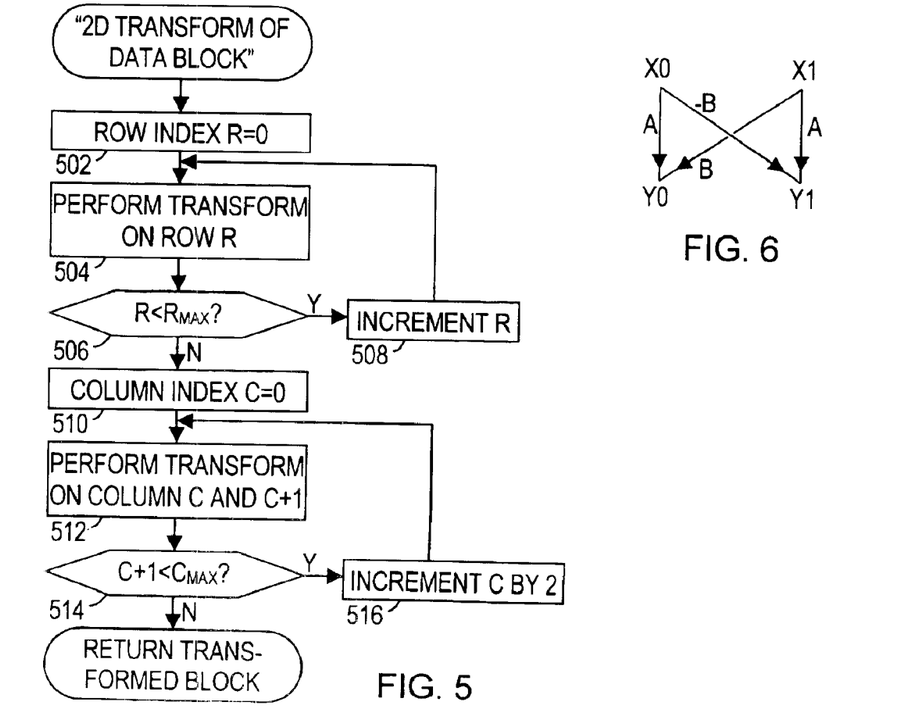
FIG. 5 shows a flowchart of a two dimensional transform.
FIG. 6 shows a weighted rotation computation.

As part of the DCT or IDCT transform being performed in block 504, the data block components XRC are loaded (arrow 404 in FIG. 4A) into 64-bit processor registers and preferably converted to 32-bit floating-point numbers (indicated by the expanded width of the components in FIG. 4A). It is expected that performing the transform using single-precision floating-point operations will provide much greater accuracy than that obtainable using integer operations. In this implementation, the input IDCT coefficients are 16-bit integer words located contiguously in memory (block 402). They are loaded into two MMX registers and then reordered before conversion to floating point form. The loading, reordering, and conversion (404) may be accomplished as follows:

| 4 | movq | mm0, QWORD PTR [ecx] | ;mm0=[b3:b2:b1:b0] |
|---|---|---|---|
| 5 | movq | mm1, QWORD PTR [ecx + 8] | ;mm1=[b7:b6:b5:b4] |
|   | . . . |   | ;omitted code checks for all-zeros |

| 24 | movq | mm7, _3dnConst_W1_W7 | ;load transform coefficients |
|---|---|---|---|
|   | . . . |   | ;omitted code for loading regs |
| 33 | pswapd | mm3, mm2 | ;mm3=[B7:B1] |
| 34 | pfmul | mm2, mm7 | ;[W1*B1:W7*B7] |
| 35 | pfmul | mm3, mm7 | ;[W1*B7:W7*B1] |
|   | . . . |   | ;omitted code for loading regs |
| 38 | pfpnacc | mm3, mm2 | ;[(W1*B1)+(W7*B7):(W7*B1)−(W1*B7)]=[C4:C5] |

-continued

//first stage

|   |   |   | ;omitted code for rotation #405 |
|---|---|---|---|
| 25 | pswapd | mm2, mm0 | ;mm2=[b1:b0:b3:b2] |
| 26 | pswapd | mm4, mm1 | ;mm4=[b5:b4:b7:b6] |
| 27 | punpckhdq | mm2, mm1 | ;mm2=[b7:b6:b1:b0] |
| 28 | punpckhdq | mm4, mm0 | ;mm4=[b3:b2:b5:b4] |
| 29 | pshufw | mm2, mm2, 0x93 | ;mm2=[b6:b1:b0:b7] |
| 30 | psbufw | mm4, mm4, 0x39 | ;mm4=[b4:b3:b2:b5] |
| 31 | pi2fw | mm2, mm2 | ;mm2=[B1:B7] |
| 32 | pi2fw | mm4, mm4 | ;mm4=[B3:B5] |
|   | . . . |   | ;omitted code for rotation #405 |
| 36 | movq | mm5, mm0 | ;mm5=[b3:b2:b1:b0] |
|   | . . . |   | ;omitted code for rotations 405,6 |
| 39 | punpckldq | mm5, mm1 | ;mm5=[b5:b4:b1:b0] |
|   | . . . |   | ;omitted code for rotation #406 |
| 43 | pi2fw | mm5, mm5 | ;mm5=[B4:B0] |
|   | . . . |   | ;omitted code for rotations |

//second stage

| 46 | punpckhdq | mm0, mm1 | ;mm0=[b7:b6:b3:b2] |
|---|---|---|---|
|   | . . . |   | ;omitted code for rotation #406 |
| 48 | pi2fw | mm0, mm0 | ;mm0=[B6:B2] |

In words, the integer values (denoted by lower-case "b") are loaded four at a time into registers (instructions 4 and 5), reordered (instructions 25–30, 39 and 46) and converted to 32-bit floating-point values (denoted by upper-case "B"). This requires no more than an average of two operations per value. The ordering of the resulting floating point values is designed to make efficient use of the pfpnacc instruction.

After the initial conversion to 32-bit values, the transform is carried out in four stages, corresponding to stages of the Vetterli and Ligtenberg fast 1-D IDCT algorithm. In this implementation, the intermediate terms have been algebraically re-factored to create terms that are calculated more quickly on the 3DNow! architecture. For example, the term W7*(B1+B7)+W1*B1−W7*B1 has been reduced to W7*B7+W1*B1. Also, due to the limited number of registers available, the four stages have been decomposed into ten substages. The substages have been ordered to complete some calculations and write out the values or dispose of intermediate products before execution other substages that normally occur earlier in the algorithm.

Stage one consists of two complex rotations. Referring momentarily to FIG. 6, a complex rotation is an operation on two values X0, X1 to produce two new values Y0, Y1 according to the relationship:

$$Y0 = A*X0 + B*X1$$

$$Y1 = -B*X0 + A*X1$$

Returning to FIG. 4A, the first stage's two rotations 405, 406 may each be performed as follows:

In words, the coefficients are loaded into a register (instruction 24), and a copy of the floating-point values is moved into a second register with the order of the values reversed (instruction 33). The original and reversed values are then vector multiplied by the coefficients (instructions 34, 35), and then accumulated by the pfpnacc operation (instruction 38). This operation causes the high end of the destination register to be subtracted from the low end of the destination register and stored in the low end of the destination register, and causes the sum of the high and low ends of the source register to be stored into the high end of the destination register. Note that the movq instruction may be performed before the pfpnacc instruction of the previous weighted rotation, so that the load latency effect is minimized.

Note that the remaining input values are not altered in the first stage, but they are nevertheless shown in FIG. 4A for completeness. This completes the first stage of FIG. 4A.

Stage two consists of reordering 407, one complex rotation 409, three sum and difference pair calculations 408, 410 and 411, and two multiplications by a constant. The reordering indicated by arrow 407 can then be performed as follows:

| | | | |
|---|---|---|---|
| 54 | movq | mm6, mm3 | ;mm6=[C4:C5] |
| | ... | | ;omitted code for sum/diff pair #409 |
| 56 | punpckhdq | mm3, mm4 | ;mm3=[C6:C4] |
| 57 | punpckldq | mm6, mm4 | ;mm6=[C5:C7] |

The calculations 408–411 can be performed as follows:

| | | | |
|---|---|---|---|
| 44 | movq | mm7,__3dnConst_W4_W4 | ; load transform constant |
| | ... | | ;omitted code for rotation #406 |
| ;second stage | | | |
| | ... | | ;omitted code for loading |
| 47 | pfmul | mm5, mm7 | ;[W4*B4:W4*B0] |
| | ... | | ;omitted code for loading |
| 49 | movq | mm7,__3dnConst_W2_W6 | ;load transform coefficient |
| 50 | pfpnacc | mm5, mm5 | ;[(W4*B0)+(W4*B4):(W4*B0)−(W4*B4)]=[D0:D1] |
| 51 | pswapd | mm1, mm0 | ;[B2:B6] |
| 52 | pfmul | mm0, mm7 | ;[W2*B6:W6*B2] |
| 53 | pfmul | mm1, mm7 | ;[W2*B2:W6*B6] |
| | ... | | ;omitted code for reordering 407 |
| 55 | pfpnacc | mm0, mm1 | ;[(W6*B6)+(W2*B2):(W6*B2)−(W2*B6)]=[D2:D3] |
| | ... | | ;omitted code for reordering 407 |
| 58 | pfpnacc | mm3, mm3 | ;mm3=[D4:D5] |
| 59 | pfpnacc | mm6, mm6 | ;mm6=[D6:D7] |

Instructions 44 and 47 perform the multiplications by a constant. Instruction 50 then performs sum and difference pair calculation 408, in which D0 and D1 are respectively set equal to C0+C1 and C0−C1. Instructions 49, 50–53 and 55 perform rotation 409. Sum and difference pair calculations 410 and 411 are performed by instructions 58 and 59, respectively. This concludes the second stage.

Stage three includes reordering 412, three sum and difference pair calculations, and two multiplications by a constant. The reordering can be performed in the following manner:

| | | | |
|---|---|---|---|
| ;third stage | | | |
| 60 | movq | mm1, mm5 | ;mm1=[D0:D1] |
| 61 | punpckhdq | mm5, mm0 | ;mm5=[D2:D0] |
| 62 | punpckldq | mm1, mm0 | ;mm1=[D3:D1] |
| | ... | | ;omitted code for sum/diff pairs 413, 414 |
| 65 | movq | mm0, mm3 | ;mm0=[D4:D5] |
| | ... | | ;omitted code for transform coeff load |
| 67 | punpckldq | mm0, mm6 | ;mm0=[D7:D5] |
| 68 | pswapd | mm6, mm6 | ;mm6=[D7:D6] |

The sum and difference calculations can be performed in the following manner:

| | | | |
|---|---|---|---|
| 63 | pfpnacc | mm5, mm5 | ;mm5=[E0:E1] |
| 64 | pfpnacc | mm1, mm1 | ;mm1=[E2:E3] |
| | ... | | ;omitted code for reordering 412 |
| 66 | movq | mm7,__3dnConst_W0_W0 | ;load transform constant |
| 69 | pfpnacc | mm0, mm0 | ;mm0=[E4:E5] |
| | ... | | ;omitted code for reordering 416 |
| 73 | pfmul | mm0, mm7 | ;mm0=[E4:E5] (scaled) |

Instructions 63, 64 and 69 perform the sum and difference calculations 413, 414 and 415, respectively. Instructions 66 and 73 perform the two multiplications by a constant. This concludes the third stage.

Stage four consists of reordering 416 and four sum and difference pair calculations 417–420. The reordering 416 can be performed in the following manner:

| | | | |
|---|---|---|---|
| 70 | punpckldq | mm6, mm5 | ;mm6=[E1:E7(=D6)] |
| 71 | movq | mm2, mm1 | ;mm2=[E2:E3] |
| 72 | pswapd | mm6, mm6 | ;mm6=[E7:E1] |
| | ... | | ;omitted code mult by constant & sum/diff 417 |
| 75 | punpckhdq | mm5, mm3 | ;mm5=[E6(=D4):E0] |
| 76 | punpckhdq | mm1, mm0 | ;mm1=[E4:E2] |
| | ... | | ;omitted code sum/diff 418 |
| 78 | punpckldq | mm2, mm0 | ;mm2=[E5:E3] |
| | ... | | ;omitted code sum/diff 419, 420 |

The sum and difference pair calculations can be done in this manner:

| | | | |
|---|---|---|---|
| ;fourth stage | | | |
| 74 | pfpnacc | mm6, mm6 | ;mm6=[F3,F4] |
| | ... | | ;omitted code for reordering 416 |
| 77 | pfpnacc | mm5, mm5 | ;mm5=[F0:F7] |
| | ... | | ;omitted code for reordering 416 |
| 79 | pfpnacc | mm1, mm1 | ;mm1=[F1:F6] |
| 80 | pfpnacc | mm2, mm2 | ;mm2=[F2:F5] |

Instructions 74, 77, 79 and 80 respectively perform sum and difference pair calculations 417–420. So, for example, instruction 74 calculates [F3:F4]=[E1+E7:E1−E7]. This concludes the fourth stage.

The values are again reordered as they are written 421 to an intermediate buffer in floating point form. This concludes an IDCT of one row. The subroutine then repeats the above steps for rows two through eight of the input buffer.

Returning to FIG. 5, block 504 of FIG. 5 includes steps 404–421, and accordingly, these steps are repeated for each row of the input block. After all the rows have been transformed, column index C is initialized to 0 in block 510. Blocks 512, 514, and 516 form a second loop in which the columns of the intermediate result buffer are transformed two at a time. In block 512, the transform is performed on the current two columns as indicated by the column index C and C+1. In block 514, the column index C+1 is compared to $C_{max}$, the largest column index in the data block. If the last column has not yet been transformed, then in block 516 the column index is incremented and the loop is repeated until each column has been transformed.

When the transform in block 512 is the IDCT transform, the operations are preferably performed using floating-point operations. To this end, the intermediate result buffer 422 shown in FIGS. 4A and 4B preferably stores the transform components $F_{RC}$ in floating-point form to avoid extra conversions between integer and floating-point form. As the transform components are loaded into processor registers two columns at a time, no conversion to floating point format is necessary.

Figure 4B:
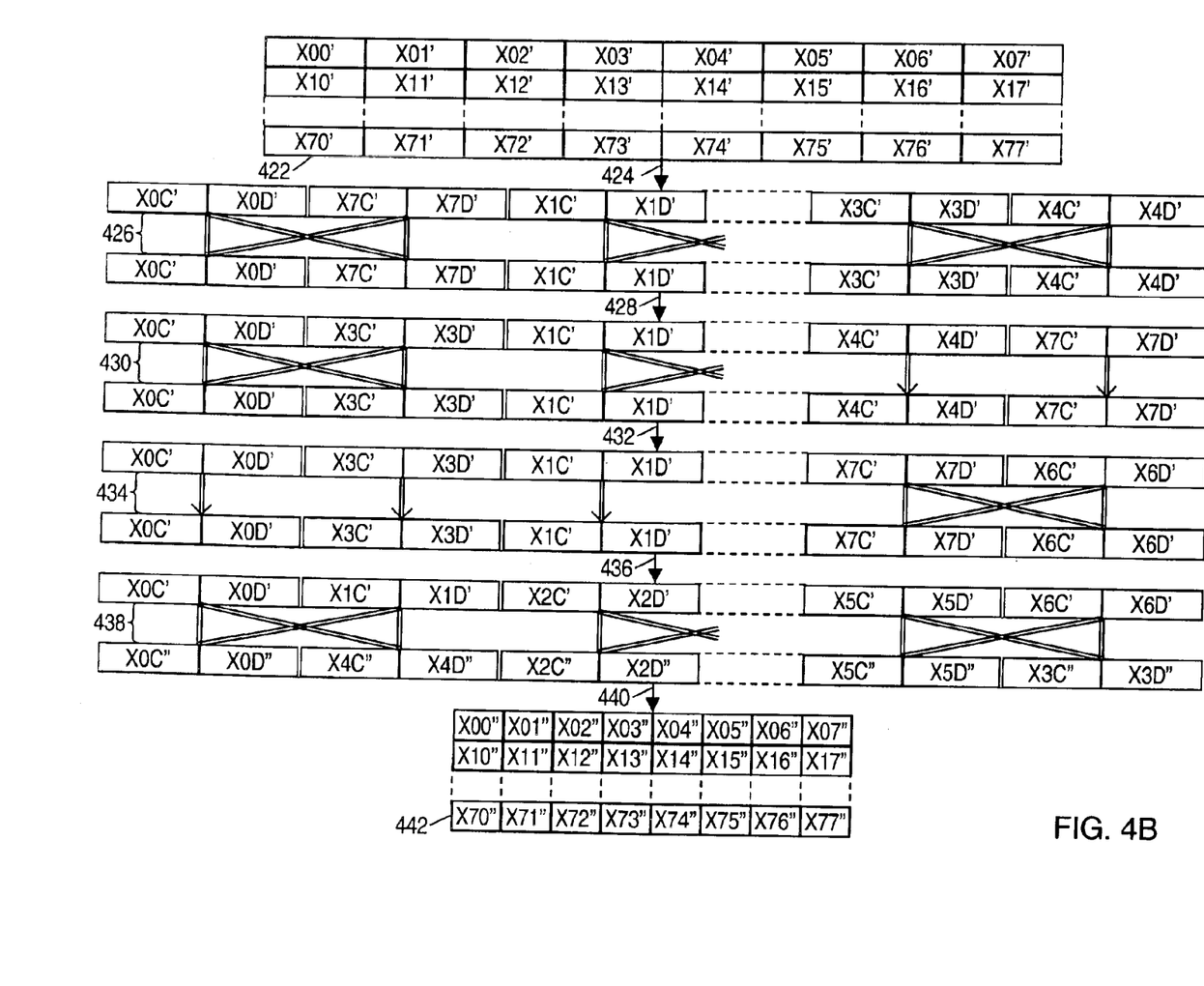

The column transform block 512 includes steps 423–453 shown in FIG. 4B. Loading step 423 can be performed as follows:

```
//Part #1
110   movq       mm0, [edx + 8*4]     ;mm0=[F1c:F1d]
111   movq       mm1, [edx + 56*4]    ;mm1=[F7c:F7d]
112   movq       mm2, mm0             ;mm2=[F1c:F1d]
113   punpckhdq  mm0, mm1             ;mm0=[F7c:F1c]
114   punpckldq  mm2, mm1             ;mm2=[F7d:F1d]
      ...                             ;omitted code for rotation
                                       424, 426
//Part #2
124   movq       mm5, [edx + 24*4]    ;mm5=[F3c:F3d]
125   movq       mm1, [edx + 40*4]    ;mm1=[F5c:F5d]
126   movq       mm4, mm5             ;mm4=[F3c:F3d]
127   punpckhdq  mm5, mm1             ;mm5=[F5c:F3c]
128   punpckldq  mm4, mm1             ;mm4=[F5d:F3d]
      ...                             ;omitted code for rotation
                                       425, 427
      ...                             ;omitted code for
                                       sum/diffs 432, 436,
                                       440, 443
//Part 5
152   movq       mm1, [edx + 16*4]    ;mm1=[F2c:F2d]
153   movq       mm3, [edx + 48*4]    ;mm3=[F6c:F6d]
154   movq       mm6, mm1             ;mm6=[F2c:F2d]
155   punpckhdq  mm1, mm3             ;mm1=[F6c:F2c]
      ...                             ;omitted code for rotation
                                       430, 434
157   punpckldq  mm6, mm3             ;mm6=[F6d:F2d]
      ...                             ;omitted code for rotation
                                       430, 434
//Part 6
168   movq       mm3, [edx]           ;mm3=[F0c:F0d]
169   movq       mm7, [edx + 32*4]    ;mm7=[F4c:F4d]
170   movq       mm2, mm3             ;mm2=[F0c:F0d]
171   punpckhdq  mm3, mm7             ;mm3=[F4c:F0c]
172   punpckldq  mm2, mm7             ;mm2=[F4d:F0d]
      ...                             ;omitted code for
                                       sum/diffs 429, 433
```

In words, the transform components $F_{RC}$ are simultaneously loaded from adjacent columns in the intermediate buffer 422. Once loaded, the components are reordered so that the columns C and D can be operated on separately in the first stage of FIG. 4B.

Although the column transform algorithm is the same fast-IDCT algorithm as the row transform algorithm, the SIMD instructions are used to provide a different parallelism. The first stage in FIG. 4B is essentially a doubling of the first stage in FIG. 4A. Rotations 424 and 426 are independent, but are performed together. Rotations 424, 426 can be performed in the following manner.

```
115   movq     mm7,_3dnConst_WI_W7
116   pswapd   mm1, mm0                    ;mm1=[F1c:F7c]
117   pswapd   mm3, mm2                    ;mm3=[F1d:F7d]
118   pfmul    mm0, mm7                    ;mm0=[F7c*W1:F1c*W7]
```

-continued

```
119   pfmul    mm1, mm7                    ;mm1=[F1c*W1:F7c*W7]
120   pfmul    mm2, mm7                    ;mm2=[F7d*W1:F1d*W7]
121   pfmul    mm3, mm7                    ;mm3=[F1d*W1:F7d*W7]
122   pfpnacc  mm0, mm1                    ;mm0=[G4c:G5c]
123   pfpnacc  mm2, mm3                    ;mm2=[G4d:G5d]
```

The implementation of each rotation is similar to rotation 405 described above. The main difference is that the instructions are more-or-less interleaved. Instructions 116, 118, 119, 122 perform rotation 424, while instructions 117, 120, 121, 123 perform rotation 426. Rotations 425, 427 can be similarly performed to complete the first stage of the column transforms.

This approach of operating on two columns at a time increases the intermediate-value storage requirements. Unless the order of operations is carefully planned, the storage capacity of the processor registers will be exceeded, forcing storage of intermediate values in memory. To minimize the traffic to and from memory, the preferred implementation at times performs operations from subsequent stages before the operations from the current stage are complete.

The sum and difference pair calculations 429 and 433 of stage two can be performed in the following manner:

```
173   movq     mm7,_3dnConst_W4_W4
174   pfpnacc  mm3, mm3                    ;mm3=[F0c+F4c:F0c-F4c]
175   pfpnacc  mm2, mm2                    ;mm2=[F0d+F4d:F0d-F4d]
176   pfmul    mm3, mm7                    ;mm3=[H0c:H1c]
                                           'completes 429
177   pfmul    mm2, mm7                    ;mm2=[H0d:H1d]
                                           'completes 433
```

Instructions 173 loads a transform constant into register mm7. Instruction 174 performs the sum and difference determination for calculation 429, and instruction 176 completes the calculation by multiplying the sum and difference by the transform constant. Inter-leaved instructions 175 and 177 operate the same way for calculation 433.

Rotations 430, 434 of stage two can be performed in a manner similar to rotations 424, 426 described above.

A different approach is used to perform sum and difference pair calculations 432 and 436. Rather an interleaving the instructions of independent calculations, two sum and difference calculations are performed in parallel. This avoids the need for separate reordering operations. (Hence, no instructions are needed for reordering step 428.) In addition to this parallelism, the instructions for calculations 432 and 436 are also inter-leaved The sum and difference pair calculations 432 and 436 of stage two can be performed in the following manner:

```
//Part #3
138   movq     mm4, mm2                    ;mm4=[G4d:G5d]
139   movq     mm5, mm0                    ;mm5=[G4c:G5c]
140   pfadd    mm0, mm3                    ;mm0=[H4c:H6c] - 1st half of 432
141   pfsub    mm5, mm3                    ;mm5=[H5c:H7c] - 2nd half of 432
142   pfsub    mm4, mm1                    ;mm4=[H5d:H7d] - 2nd half of 436
143   pswapd   mm5, mm5                    ;mm5=[H7c:H5c]
```

```
144  pswapd    mm4, mm4    ;mm4=[H7d:H5d]
145  pfadd     mm2, mm1    ;mm2=[H4d:H6d] - 1st half of 436
```

Instructions 139–141 perform calculation 432, while instructions 138, 142, 145 perform calculation 436. To the extent that any reordering is needed in step 437, this is provided by instructions 143 and 144. This concludes stage two.

The sum and difference pair calculations 439–443 of stage three can be performed in the same manner as calculations 429, 432, 433 and 436 of stage two described previously.

Yet a different type of parallelism is used to perform sum and difference pair calculations 445–448 in stage four. The values are reordered so as to rejoin values from adjacent columns C and D. The calculations for stage four are then performed in synchronization on the two adjacent columns. Reordering step 444 can be performed as follows:

```
//Rearrange
184  movq       mm6, mm4      ;mm6=[I4d:I5d]
185  punpckldq  mm4, mm5      ;mm4=[I5c:I5d]
186  punpckhdq  mm6, mm5      ;mm6=[I4c:I4d]
187  movq       mm5, mm1      ;mm5=[I0d:I2d]
188  punpckhdq  mm1, mm3      ;mm1=[I0c:I0d]
189  punpckldq  mm5, mm3      ;mm5=[I2c:I2d]
     . . .
198  movq       mm6, mm2      ;mm6=[I1d:I3d]
199  punpckldq  mm2, mm7      ;mm2=[I3c:I3d]
200  punpckhdq  mm6, mm7      ;mm6=[I1c:I1d]
     . . .
206  movq       mm3, tmpQWord ;mm3=[I6d:I7d]
     . . .
211  movq       mm4, mm3      ;mm4=[I6d:I7d]
212  punpckldq  mm3, mm0      ;mm3=[I7c:I7d]
213  punpckhdq  mm4, mm0      ;mm4=[I6c:I6d]
```

Finally, each of the sum and difference pair operations 445–448 of stage four can be formed in the following manner:

```
190  movq    mm3, mm5          ;mm3=[I2c:I2d]
191  pfadd   mm5, mm6          ;mm5=[J1c:J1d]
192  pfsub   mm3, mm6          ;mm3=[J6c:J6d]
193  pf2iw   mm5, mm5          ;mm5=[0:j1c:0:j1d]
194  pf2iw   mm3, mm3          ;mm3=[0:j6c:0:j6d]
195  pshufw  mm5, mm5, 0x'     ;mm5=[0:0:j1c:j1d]
196  pshufw  mm3, mm3, 0xk_    ;mm3=[0:0:j6c:j6d]
197  movd    DWORD PTR [ecx + 8*2], mm5
     . . .
202  movd    DWORD PTR [ecx + 48*2], mm3
```

Instructions 190–192 perform calculation 447, which determines a sum and difference pair for each column C and D. Instructions 193–197, 202 convert the resulting values into 16-bit integers and write the results to an output buffer (step 453). As each of the remaining stage four calculations is complete, the corresponding results are similarly converted and stored in the output buffer 454.

Block 512 of FIG. 5 includes steps 423–453, and accordingly, these steps are repeated for each adjacent pair of columns. After the column transform is complete, the output buffer contains the now-two-dimensional inverse-transform components $J_{RC}$ in 16-bit integer form.

It is noted that upon study of the method of FIG. 5, several variations will become apparent to one of ordinary skill in the art. For example, the column transforms may be performed before the row transforms. The rows may be transformed in any order, as may the column pairs. The intermediate result buffer may be written in column order and accessed in row order rather than written in row order and accessed in column order. The description of FIG. 5 is not intended to exclude such variations.

It is further noted that the transform methods described herein may be performed by a computer system as shown in FIGS. 1–3 or a variant thereof. Specifically, the methods may exist in the form of software stored in memory 112 and executed by microprocessor 110 to process multimedia data for presentation of images via a display or sound via a speaker. During the compression of multimedia data, blocks of data are transformed into transform coefficients indicative of the multimedia presentation, i.e. sound and/or video images. The IDCT methods may be advantageously be employed to convert the transform coefficients into data indicative of the desired images or sounds.

The transform methods described herein may exist in the form of instructions received, sent or stored upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The following listing presents a subroutine for an inverse two-dimensional DCT transform on 8×8 blocks of 16-bit-valued pixels. These programs use the parallel computation methods described herein that advantageously exploit the structure and instruction set of modern processors to achieve a significantly improved performance. Instruction numbering has been added for ease of reference; the numbering is not part of the routine.

These subroutines use various instructions that are described in greater detail in AMD's "3DNow! Technology Manual" and AMD's "AMD Extensions to the 3D Now! and MMX Instruction Sets Manual", both of which are incorporated herein by reference.

```
static const __int64 __3dnConst_W6_W2=0x3e43ef143eec8360;
static const __int64 __3dnConst_W1_W7=0x3efb14bd3dc7c5c7;
static const __int64 __3dnConst_W5_W3=0x3e8e39d93ed4db31;
static const __int64 __3dnConst_W4_W4=0x3eb504f43eb504f4;
static const __int64 __3dnConst_W2_W6=0x3eec83603e43ef14;
```

```
static const __int64 __3dnConst_W0_W0=0x3f3504f43f3504f4;
/******************************************************************
 *                                                                *
 * 2_dimensional Inverse Discrete Cosine Transform                *
 * by D. Horton 8/16/99                                           *
 ******************************************************************/
static const __int64
        __3dnConst_W1_W7=0x3efb14bd3dc7c5c7,
        __3dnConst_W5_W3=0x3e8e39d93ed4db31,
        __3dnConst_W4_W4=0x3eb504f43eb504f4,
        __3dnConst_W2_W6=0x3eec83603e43ef14,
        __3dnconst_W0_W0=0x3f3504f43f3504f4;
        __MMXConst_AllZero=0x0000000000000000;
/* only one of these three versions of the vertical
transform may be selected, the others must be zero */
#define __1stVT__ 0
#define __2ndVT__ 0
#define __3rdVT__ 1
/* this variable determines whether the data is checked
to look for possibility of early termination */
/* This section needs more work before is usable*/
#define __chk_idata__ 1
int idct_3dn(short *inbuf, short *outbuf)
{
    float tmpbuf[64];
    double tmpQWord;
    /* Horizontal Transform */
    __asm {
1   mov         ecx, inbuf
2   lea         edx, tmpbuf
3   mov         eax, 8
__idct_hloop_3dn:
4   movq        mm0, QWORD PTR [ecx]              ;[b3:b2:b1:b0]
5   movq        mm1, QWORD PTR [ecx + 8]          ;[b7:b6:b5:b4]
#if __chk_idata__
6   movq        mm6, __MMXConst_AllZero
7   movq        mm7, __MMXConst_AllZero
8   psadbw      mm6, mm0
9   psadbw      mm7, mm1
10  punpcklwd   mm6, mm7
11  movd        ebx, mm6
12  test        ebx, ebx
13  jnz         __good_idata
    ;have to clear this row in tempBuf
14  movq        [edx], mm0
15  movq        [edx + 8], mm0
16  add         ecx, 16
17  movq        [edx + 16], mm0
18  movq        [edx + 24], mm0
19  add         edx, 32
20  dec         al
21  jnz         __idct_hloop_3dn                  ;repeat the hloop
22  jmp         __idct_vtrans_setup               ;finished, go to vertical transform
__good_idata:
23  or          eax, 0x800000                     ;this row has an entry
*endif
    //first stage
24  movq        mm7, __3dnConst_W1_W7
25  pswapd      mm2, mm0
28  pswapd      mm4, mm1
27  punpckhdq   mm2, mm1                          ;[b7:b6:b1:b0]
28  punpckhdq   mm4, mm0                          ;[b3:b2:b5:b4]
29  pshufw      mm2, mm2, 0x93                    ;%10010011 => [b6:b1:b0:b7]
30  pshufw      mm4, mm4, 0x39                    ;%00111001 => [b4:b3:b2:b5]
31  pi2fw       mm2, mm2                          ;[B1:B7]
32  pi2fw       mm4, mm4                          ;[B3:B5]
33  pswapd      mm3, mm2                          ;[B7:B1]
34  pfmul       mm2, mm7                          ;[W1*B1:W7*B7]
35  pfmul       mm3, mm7                          ;[W1*B7:W7*B1]
36  movq        mm5, mm0
37  movq        mm7, __3dnConst_W5_W3
38  pfpnacc     mm3, mm2                          ;[(W1*B1)+(W7*B7):(W7*B1)−(W1*B7)]=[x4:x5]
39  punpckldq   mm5, mm1                          ;[b5:b4:b1:b0]
40  pswapd      mm2, mm4                          ;[B5:B3]
41  pfmul       mm4, mm7                          ;[W5*B3:W3*B5]
42  pfmul       mm2, mm7                          ;[W5*B5:W3*B3]
43  pi2fw       mm5, mm5                          ;[B4:B0]
44  movq        mm7, __3dnConst_W4_W4
45  pfpnacc     mm4, mm2                          ;[(W5*B5)+(W3*B3):(W3*B5)−(W5*B3)]=[x6:x7]
```

-continued

```
;second stage
    46  punpckhdq    mm0, mm1                   ;[b7:b6:b3:b2]
    47  pfmul        mm5, mm7                   ;[W4*B4:W4*B0]
    48  pi2fw        mm0, mm0                   ;[B6:B2]
    49  movq         mm7, __3dnConst_W2_W6
    50  pfpnacc      mm5, mm5                   ;[(W4*B0)+(W4*B4):(W4*B0)-(W4*B4)]=[tmp1:x0]
    51  pswapd       mm1, mm0                   ;[B2:B6]
    52  pfmul        mm0, mm7                   ;[W2*B6:W6*B2]
    53  pfmul        mm1, mm7                   ;[W2*B2:W6*B6]
    54  movq         mm6, mm3
    55  pfpnacc      mm0, mm1                   ;[(W6*B6)+(W2*B2):(W6*B2)-[W2*B6)]=[x3:x2]
    56  punpckhdq    mm3, mm4                   ;[(W5*B5)+(W3*B3):(W1*B1)+(W7*B7)]=[x6:x4]
    57  punpckldq    mm6, mm4                   ;[(W3*B5)-(W5*B3):(W7*B1)-(W1*B7)]=[x7:x5]
    58  pfpnacc      mm3, mm3 ;[(W5*B5)+(W3*B3)+(W1*B1)+(W7*B7):(W1*B1)+(W7*B7)-
(W5*B5)-(W3*B3)]=[(x4+x6):(x4-x6)]=[x1:x4]
    59  pfpnacc      mm6, mm6 ;[(W3*B5)-(W5*B3)+(W7*B1)-(W1*B7):(W7*B1)-(W1*B7)-
(W3*B5)+(W5*B3)]=[(x5+x7):(x5-x7)]=[x6:tmp2]
        ;third stage
    60  movq         mm1, mm5
    61  punpckhdq    mm5, mm0                   ;[(W6*B6)+(W2*B2):(W4*B0)+(W4*B4)]=[x3:tmp1]
    62  punpckldq    mm1, mm0                   ;[(W6*B2)-(W2*B6):(W4*B0)-(W4*B4)]=[x2:x0]
    63  pfpnacc      mm5, mm5 ;[(W4*B0)+(W4*B4)+(W6*B6)+(W2*B2):(W4*B0)+(W4*B4)-
(W6*B6)-(W2*B2)]=[(tmp1+x3):(tmp1-x3)]=[x7:x5]
    64  pfpnacc      mm1, mm1 ;[(W4*B0)-(W4*B4)+(W6*B2)-(W2*B6):(W4*B0)-(W4*B4)-
(W6*B2)+(W2*B6)]=[(x0+x2):(x0-x2)]=[x3:x0]
    65  movq         mm0, mm3
    66  movq         mm7, __3dnConst_W0_W0
    67  punpckldq    mm0, mm6 ;[(W7*B1)-(W1*B7)-(W3*B5)+(W5*B3):(W1*B1)+(W7*B7)-
(W5*B5)-(W3*B3)]=[tmp2:x4]
    68  pswapd       mm6, mm6
    69  pfpnacc      mm0, mm0                   ;[(x4+tmp2):(x4-tmp2)]
    70  punpckldq    mm6, mm5
    71  movq         mm2, mm1                   ;[x3:x0]
    72  pswapd       mm6, mm6
    73  pfmul        mm0, mm7                   ;[x2:x4]
        ;fourth stage
    74  pfpnacc      mm6, mm6   ;[Tp3:Tp4]
    75  punpckhdq    mm5, mm3   ;[x1:x7]
    76  punpckhdq    mm1, mm0   ;[x2:x3]
    77  pfpnacc      mm5, mm5   ;[Tp0:Tp7]
    78  punpckldq    mm2, mm0   ;[x4:x0]
    79  pfpnacc      mm1, mm1   ;[Tp1:Tp6]
    80  pfpnacc      mm2, mm2   ;[Tp2:Tp5]
        ;use noninverted intermediate storage buffer
    81  movq         mm4, mm5
    82  punpckhdq    mm5, mm1                   ;[Tp1:Tp0]
    83  add          ecx, 16
    84  movntq       QWORD PTR [edx], mm5
    85  punpckldq    mm1, mm4                   ;[Tp7:Tp6]
    86  movq         mm4, mm2                   ;[Tp2:Tp5]
    87  movntq       QWORD PTR [edx + 24], mm1
    88  punpckhdq    mm2, mm6                   ;[Tp3:Tp2]
    89  punpckldq    mm6, mm4                   ;[Tp5:Tp4]
    90  movntq       QWORD PTR [edx + 9], mm2
    91  add          edx, 32
#if _chk_idata_
    93  dec          al
#else
    94  dec          eax
#endif
    95  movntq       QWORD PTR [edx_16], mm6
    96  jnz          _idct_hloop_3dn
_idct_vtrans_setup:
    97  mov          ecx, outbuf
#if _chk_idata_
    98  test         eax, 0x800000
    99  jnz          _idct_3dn_vloop_cont
   100  movq         mm0, __MMXConst_AllZero
   101  mov          eax, 8
_idct_vsetup_loop:                              ;still have to write zeros to output buffer
   102  movq         [ecx], mm0
   103  movq         [ecx + 8], mm0
   104  add          ecx, 16
   105  dec          eax
   106  jnz          _idct_vsetup_loop
   107  jmp          _end_idct_3dn
#endif
_idct_3dn_vloop_cont:
   108  sub          edx, 32*8                  ;put edx back to start of tmpbuf
```

-continued

```
109 mov        eax, 4
__idct__vloop__3dn:
       // Part #1
110 movq       mm0, [edx + 8*4]            ;[C9:C8]
111 movq       mm1, [edx + 56*4]           ;[C57:C56]
112 movq       mm2, mm0
113 punpckhdq  mm0, mm1                    ;[C57:C9]
114 punpckldq  mm2, mm1                    ;[C56:C8]
115 movq       mm7, __3dnConst__W1__W7
116 pswapd     mm1, mm0                    ;[C9:C57]
117 pswapd     mm3, mm2                    ;[C8:C56]
118 pfmul      mm0, mm7                    ;[C57*W1:C9*W7]
119 pfmul      mm1, mm7                    ;[C9*W1:C57*W7]
120 pfmul      mm2, mm7                    ;[C56*W1:C5*W7]
121 pfmul      mm3, mm7                    ;[C5*W1:C56*W7]
122 pfpnacc    mm0, mm1                    ;[(C9*W1)+(C57*W7):(C9*W7)−(C57*W1)]=[x4b:x5b]
123 pfpnacc    mm2, mm3                    ;[(C8*W1)+(C56*W7):(C8*W7)−(C56*W1)]=[x4a:x5a]
       //Part #2
124 movq       mm5, [edx + 24*4]           ;[C25:C24]
125 movq       mm1, [edx + 40*4]           ;[C41:C40]
126 movq       mm4, mm5
127 punpckhdq  mm5, mm1                    ;[C41:C25]
128 punpckldq  mm4, mm1                    ;[C40:C24]
129 movq       mm7, __3dnConst__W5__W3
130 pswapd     mm3, mm5                    ;[C25:C41]
131 pswapd     mm1, mm4                    ;[C24:C40]
132 pfmul      mm5, mm7                    ;[C41*W5:C25*W3]
133 pfmul      mm3, mm7                    ;[C25*W5:C41*W3]
134 pfmul      mm4, mm7                    ;[C40*W5:C24*W3]
135 pfmul      mm1, mm7                    ;[C24*W5:C40*W3]
136 pfpnacc    mm3, mm5                    ;[(C41*W5)+(C25*W3):(C41*W3)−(C25*W5)]=[x6b:x7b]
137 pfpnacc    mm1, mm4                    ;[(C40*W5)+(C24*W3):(C40*W3)−(C24*W5)]=[x6a:x7a]
       //Part #3
138 movq       mm4, mm2                    ;[x4a:x5a]
139 movq       mm5, mm0                    ;[x4b:x5b]
140 pfadd      mm0, mm3                    ;[(x4b+x6b:x5b+x7b)]=[x1b':x6b']
141 pfsub      mm5, mm3                    ;[(x4b−x6b:x5b−x7b)]=[x4b:Tmp2b]
142 pfsub      mm4, mm1                    ;[(x4a−x6a:x5a−x7a)]=[x4a:Tmp2a]
143 pswapd     mm5, m5                     ;[Tmp2b:x4b]
144 pswapd     mm4, mm4                    ;[Tmp2a:x4a]
145 pfadd      mm2, mm1                    ;[x4a+x6a:x5a+x7a)]=[x1a':x6a']
       // Part #4
146 movq       mm7, __3dnConst__W0__W0
147 pfpnacc    mm4, mm4                    ;[(x4a+Tmp2a):(x4a−Tmp2a)]
148 pfpnacc    mm5, mm5                    ;[(x4b+Tmp2b):(x4b−Tmp2b)]
149 pfmul      mm4, mm7                    ;[x2a':x4a']
150 pfmul      mm5, mm7                    ;[x2b':x4b']
151 movq       tmpQWord, mm2
       // Part 5
152 movq       mm1, [edx + 16*4]           ;[C17:C16]
153 movq       mm3, [edx + 48*4]           ;[C49:C48]
154 movq       mm6, mm1
155 punpckhdq  mm1, mm3                    ;[C49:C17]
156 movq       mm7, __3dnConst__W2__W6
157 punpckldq  mm6, mm3                    ;[C48:C16]
158 pswapd     mm3, mm1                    ;[C17:C49]
159 movq       tmpQWord2, mm0
160 pfmul      mm1, mm7                    ;[C49*W2:C17*W6]
161 pfmul      mm3, mm7                    ;[C17*W2:C49*W6]
162 pfpnacc    mm1, mm3                    ;[C17*W2+C49*W6:C17*W6−C49*W2]=[x3b:x2b]
164 pswapd     mm3, mm6                    ;[C16:C48]
165 pfmul      mm6, mm7
166 pfmul      mm3, mm7
167 pfpnacc    mm6, mm3                    ;[C16*W2+C48*W6:C16*W6−C48*W2]=[x3a:x2a]
       // Part 6
168 movq       mm3, [edx]                  ;[C1:C0]
169 movq       mm7, [edx + 32*4]           ;[C33:C32]
170 movq       mm2, mm3
171 punpckhdq  mm3, mm7                    ;[C33:C1]
172 punpckldq  mm2, mm7                    ;[C32:C0]
173 movq       mm7, __3dnConst__W4__W4
174 pfpnacc    mm3, mm3
175 pfpnacc    mm2, mm2
176 pfmul      mm3, mm7                    ;[(C1+C33)*W4:(C1−C33)*W4]=[Tmp1b:x0b]
177 pfmul      mm2, mm7                    ;[(C0+C32)*W4:(C0−C32)*W4]=[Tmp1a:x0a]
       // Parts 7 & 9
178 movq       mm7, mm3
179 pfadd      mm3, mm1                    ;[Tmp1b+x3b:x0b+x2b] = [x7b':x3b']
180 pfsub      mm7, mm1                    ;[Tmp1b−x3b:x0b−x2b] = [x5b':x0b']
```

-continued

```
181  movq        mm1, mm2
182  pfsub       mm2, mm6              ;[Tmp1a-x3a:x0a-x2a] = [x5a':x0a']
183  pfadd       mm1, mm6              ;[Tmp1a+x3a:x0a+x2a]= [x7a':x3a']
     // Rearrange and write out
184  movq        mm6, mm4              ;[x2a':x4a']
185  punpckldq   mm4, mm5              ;[x4b':x4a']
186  punpckhdq   mm6, mm5              ;[x2b':x2a']
187  movq        mm5, mm1
188  punpckhdq   mm1, mm3              ;[x7b':x7a']
189  punpckldq   mm5, mm3              ;[x3b':x3a']
190  movq        mm3, mm5
191  pfadd       mm5, mm6              ;[x3b'+x2b':x3a'+x2a'] = [FB9:FB5]
192  pfsub       mm3, mm6              ;[x3b'-x2b':x3a'-x2a'] = [FB49:FB48]
193  pf2iw       mm5, mm5
194  pf2iw       mm3, mm3
195  pshufw      mm5, mm5, 0x'
196  pshufw      mm3, mm3, 0xk_
197  movd        DWORD PTR [ecx + 8*2], mm5
198  movq        mm6, mm2              ;[x5a':x0a']
199  punpckldq   mm2, mm7              ;[x0b':x0a']
200  punpckhdq   mm6, mm7              ;[x5b':x5a']
201  movq        mm5, mm2
202  movd        DWORD PTR [ecx + 48*2], mm3
203  pfadd       mm2, mm4              ;[x0b'+x4b':x0a'+x4a'] = [FB17:FB16]
204  pfsub       mm5, mm4              ;[x0b'-x4b':x0a'-x4a'] = [FB41:FB40]
205  pf2iw       mm2, mm2
206  movq        mm3, tmpQword         ;[x1a':x6a']
207  pf2iw       mm5, mm5
208  pshufw      mm2, mm2, 0xB8
209  pshufw      mm5, mm5, 0xB8
210  movd        DWORD PTR [ecx + 16'2], mm2
211  movq        mm4, mm3
212  punpckldq   mm3, mm0              ;[x6b':x6a']
213  punpckhdq   mm4, mm0              ;[x1b':x1a']
214  movq        mm7, mm6
215  movd        DWORD PTR [ecx + 40*2], mm5
216  pfadd       mm6, mm3              ;[x5b'+x6b':x5a'+x6a'] = [FB25:FB24]
217  pfsub       mm7, mm3              ;[x5b'-x6b':x5a'-x6a'] = [FB33:FB32]
218  pf2iw       mm6, mm6
219  pf2iw       mm7, mm7
220  pshufw      mm6, mm6, 0xD8
221  pshufw      mm7, mm7, 0xD8
222  movd        DWORD PTR [ecx + 24*2], mm6
223  movq        mm3, mm1              ;[x7b':x7a']
224  pfadd       mm1, mm4              ;[x7b'+x1b':x7a'+x1a'] = [FB1:FB0]
225  pfsub       mm3, mm4              ;[x7b'-x1b':x7a'-x1a'] = [FB57:FB56]
226  movd        DWORD PTR [ecx + 32*2], mm7
227  pf2iw       mm1, mm1
228  pf2iw       mm3, mm3
229  pshufw      mm1, mm1, 0xD8
230  pshufw      mm3, mm3, 0xD8
231  movd        DWORD PTR [ecx], mm1
232  add         ecx, 4
233  add         edx, 8
234  movd        DWORD PTR [ecx + 56*2-4], mm3
235  dec         eax
236  jnz         _idct_vloop_3dn
#endif                                 // end 3rd version of vertical idct
_end_idct_3dn:
237  mov         eax, 0
238  femms
     ]                                 //end of assembly code
     return 0;
     ]                                 //end of IDCT_3dn( )
#endif
```

What is claimed is:

1. A method of performing a two-dimensional inverse discrete cosine transform (IDCT) using a microprocessor having an instruction set that includes single-instruction multiple-data (SIMD) floating-point instructions, wherein the method comprises:

receiving a two-dimensional block of integer data having C columns and R rows, wherein each of the R rows contains a set of C row data values, wherein the block of integer data is indicative of a portion of an image, wherein each of C and R is an even integer; and for each row,
loading the entire set of C row data values of the row into a set of C/2 registers of the microprocessor;
converting the C row data values into floating-point form, wherein each of the registers holds two of the floating-point row data values; and
performing a plurality of weighted-rotation operations on the values in the registers, wherein the weighted-rotation operations are performed using SIMD floating-point instructions;
altering the arrangement of values in the registers;
performing a weighted-rotation operation and a plurality of sum and difference pair calculations on the values in the registers;
again altering the arrangement of the values in the registers;
performing a second plurality of sum and difference pair calculations on the values in the registers;
yet again altering the arrangement of the values in the registers; and
performing a fourth plurality of sum and difference pair calculations on the values in the registers to obtain C intermediate floating-point values; and
storing the C intermediate floating-point values to a next available row of an intermediate buffer;
for two columns of the intermediate buffer at a time,
loading data from said two columns into a plurality of registers of the microprocessor so that each of the registers holds one value from a first of the two columns and one value from a second of the two columns, wherein the one value from the first of the two columns and the one value from the second of the two columns are taken from the same row of the intermediate buffer; and
performing a plurality of weighted-rotation operations on the values in the registers, wherein the weighted-rotation operations for said two columns are independently performed using interleaved SIMD floating-point instructions.

2. The method of claim 1, wherein said converting is accomplished using a packed integer word to floating-point conversion (pi2fw) instruction.

3. The method of claim 1, wherein said weighted-rotation operations are accomplished using a packed swap doubleword (pswapd) instruction, a packed floating-point multiplication (pfmul) instruction and a packed floating-point negative accumulate (pfpnacc) instruction.

4. The method of claim 1, wherein said weighted-rotation operations for two columns at a time are accomplished using a packed floating-point multiplication (pfmul) instruction, a packed floating-point subtraction (pfsub) instruction and a packed floating-point addition (pfadd) instruction.

5. The method of claim 1, further comprising:
performing a plurality of sum and difference pair operations on the results of the weighted-rotation operations, wherein the plurality of sum and difference pair operations are performed in parallel using SIMD instructions.

6. The method of claim 5, further comprising:
performing a second plurality of sum and difference pair operations in parallel using SIMD instructions to obtain intermediate values for each of the two columns;
reordering the intermediate values to place corresponding values from the two columns in shared registers;
using SIMD instructions to perform a third plurality of sum and difference pair operations in parallel on the corresponding values from the two columns to produce floating point results; and
converting the floating point results to integer results.

7. The method of claim 6, further comprising:
for two columns at a time, writing the integer results to an output buffer.

8. A method of performing an inverse discrete cosine transform (IDCT) using a microprocessor having an instruction set that includes single-instruction multiple-data (SIMD) floating-point instructions, wherein the method comprises:
receiving a two-dimensional block of integer data having C columns and R rows wherein each of C and R is an even integer, wherein the two-dimensional block represents a portion of an image; and
for two columns at a time,
loading column data from the two columns into registers of the microprocessor so that each of the registers holds one value from a first of the two columns and one value from a second of the two columns, wherein the one value from the first of the two columns and the one value from the second of the two columns are taken from the same row of the two-dimensional block;
converting the column data into floating-point form; and
performing a plurality of weighted-rotation operations on the values in the registers to produce first stage results, wherein the weighted-rotation operations for the two columns are performed independently using interleaved SIMD floating-point instructions.

9. The method of claim 8, wherein said weighted-rotation operations are accomplished using a packed floating-point multiplication (pfmul) instruction, a packed floating-point subtraction (pfsub) instruction and a packed floating-point addition (pfadd) instruction.

10. The method of claim 8, further comprising:
for each column,
performing a weighted-rotation operation and a plurality of sum and difference pair calculations on the first stage results to produce second stage results, wherein the plurality of sum and difference pair calculations are performed in parallel using SIMD instructions.

11. The method of claim 10, further comprising:
for each column, performing a second plurality of sum and difference pair calculations on the second stage results to produce third stage results, wherein the second plurality of sum and difference pair calculations are performed in parallel using SIMD instructions; and
for two columns at a time:
reordering the third stage results to provide registers with corresponding results from each column;
performing a third plurality of sum and difference pair calculations on the reordered third stage results to produce fourth stage results, wherein the third plurality of sum and difference pair calculations are performed on both columns in parallel using SIMD instructions; and
converting the fourth stage results into integer results.

12. The method of claim 11, further comprising:
for two columns at a time, writing the integer results to an output buffer.

* * * * *